C. R. RANEY & R. C. LIVESAY.
FRAME FOR SHOCKING MACHINES.
APPLICATION FILED JAN. 6, 1913. RENEWED OCT. 20, 1916.
1,222,799.
Patented Apr. 17, 1917.
3 SHEETS—SHEET 1.
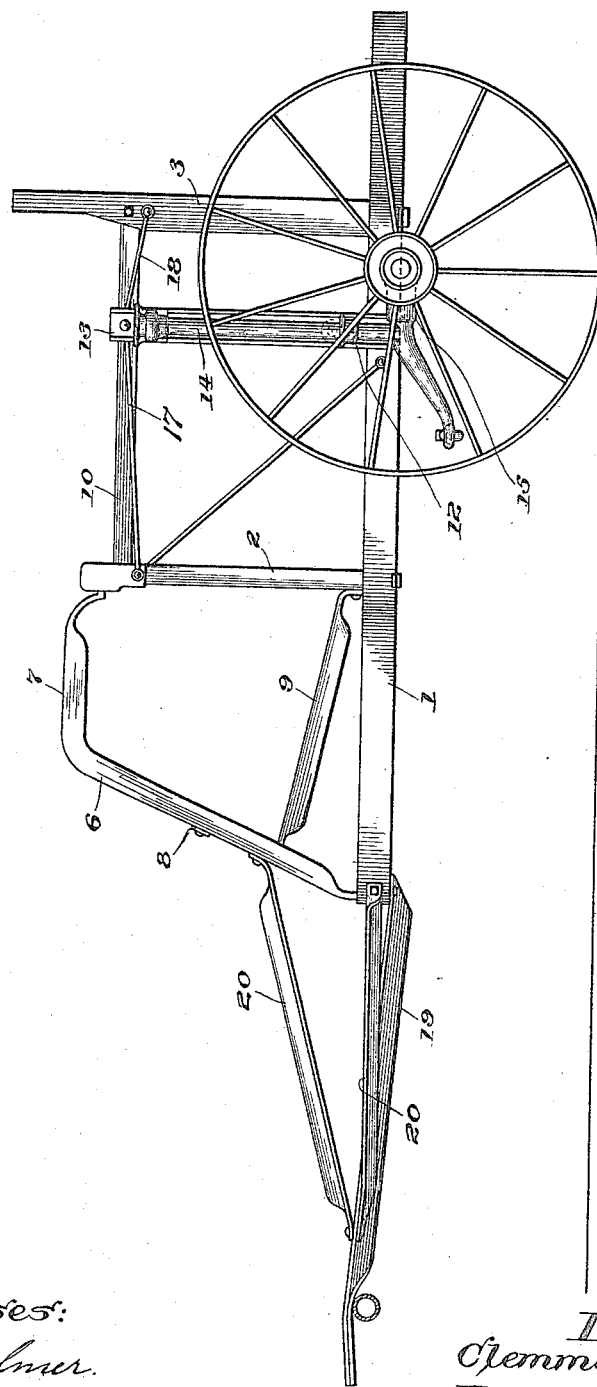

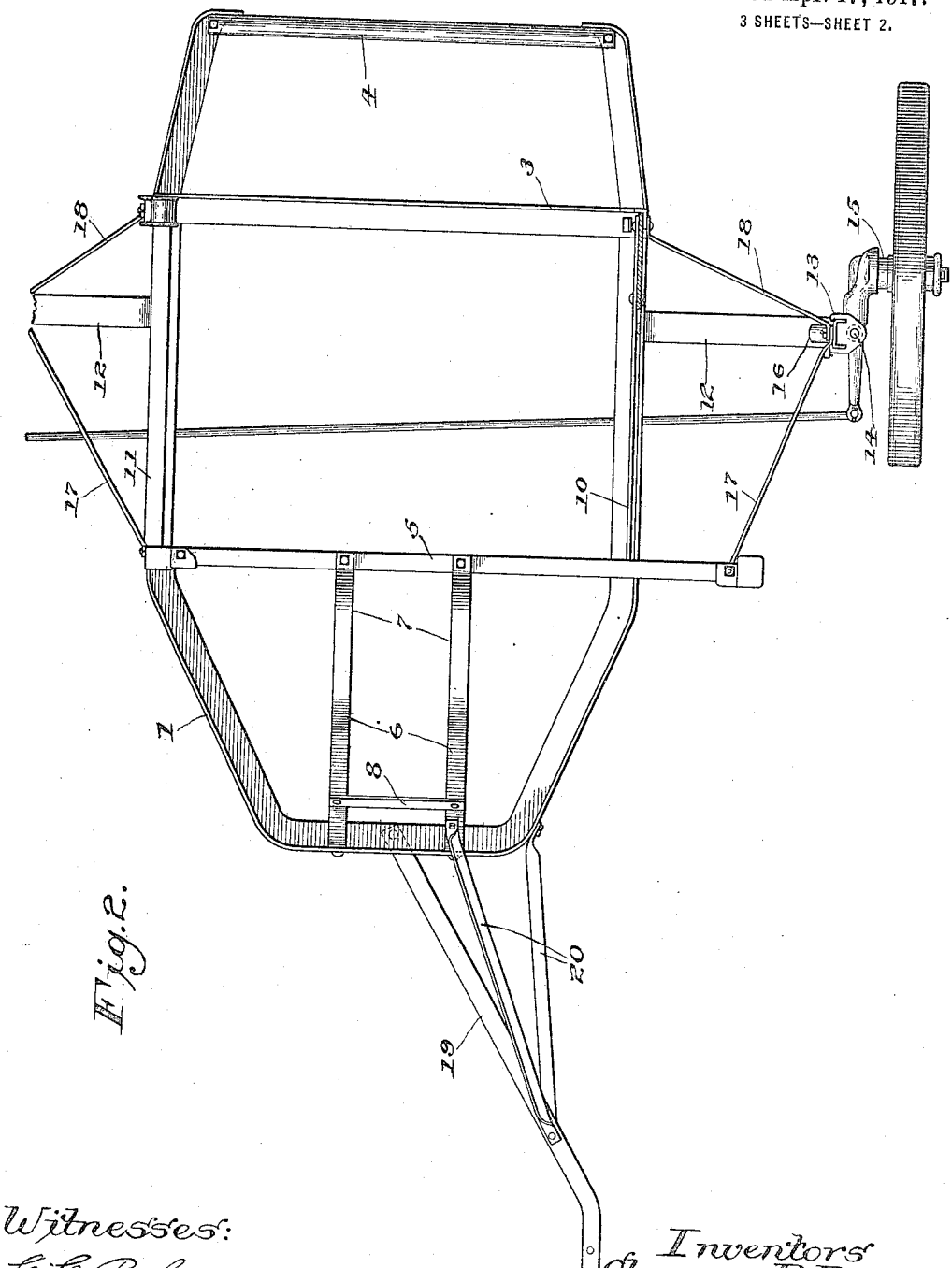

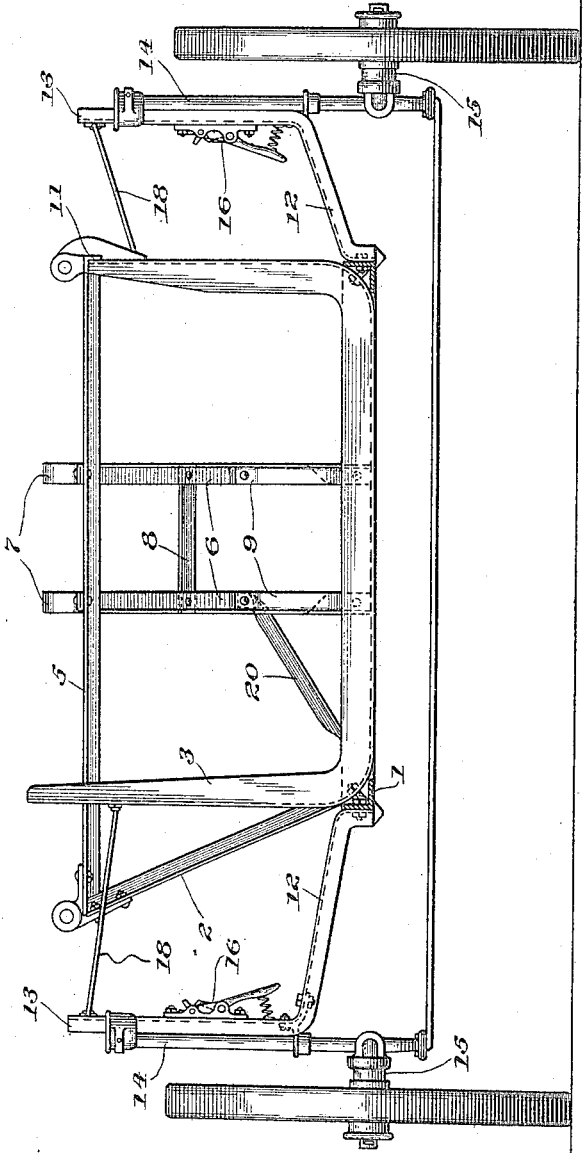

UNITED STATES PATENT OFFICE.

CLEMMA R. RANEY, OF CHICAGO, AND ROBERT C. LIVESAY, OF MOLINE, ILLINOIS, ASSIGNORS TO INTERNATIONAL HARVESTER COMPANY OF NEW JERSEY, A CORPORATION OF NEW JERSEY.

FRAME FOR SHOCKING-MACHINES.

1,222,799.            Specification of Letters Patent.       Patented Apr. 17, 1917.

Application filed January 6, 1913, Serial No. 740,481.   Renewed October 20, 1916.   Serial No. 126,793.

*To all whom it may concern:*

Be it known that we, CLEMMA R. RANEY and ROBERT C. LIVESAY, citizens of the United States, residing at Chicago and Moline, respectively, in the county of Cook and the county of Rock Island, respectively, and State of Illinois, have invented certain new and useful Improvements in Frames for Shocking-Machines, of which the following is a full, clear, and exact specification.

Our invention relates to frames for shocking machines.

It has for its object to support the operating mechanism of a shocking machine in an improved manner. We attain this object by providing an improved frame of rigid construction, the parts of which are rigidly connected together and braced against the conflicting stresses to which the frame is subjected in service.

In the accompanying drawings we have illustrated one embodiment which our invention may assume in practice. It is to be understood, however, that the form shown therein is susceptible of modification.

Figure 1 is a side elevation of the frame;

Fig. 2 is a top plan view of the frame;

Fig. 3 is a rear elevation of the same, partially in section.

In this construction a single longitudinally disposed substantially U-shaped member 1 coöperates with a pair of spaced substantially U-shaped members 2 and 3 extending upward at right angles therefrom to form the skeleton of the frame. The member 1 is preferably formed of angle steel and is slightly flattened or bent inward at both ends in order to reduce the size of the same and give increased rigidity. As shown, this member is so mounted that one of the sides of the angle is substantially parallel with the ground. As shown, the rear ends of the arms of this member are rigidly connected by a transversely extending strip 4. Between the ends of the member 1 the U-shaped members 2 and 3 are carried.

These members 2 and 3 are each preferably formed of angle steel and are rigidly attached to the member 1 at their bottoms. The member 2 is fixed to the front of the member 1 adjacent the flattened portion of the same, and is provided with a vertically extending arm and an arm protruding upward and outward at an angle. The upper ends of these two arms are rigidly connected by means of an angle plate 5. A pair of parallel braces 6 is provided which braces extend between the front end of the member 1 and the plate 5 and are rigidly attached thereto. These members are preferably flattened at their top to form a frame 7, as shown in Fig. 1, and are provided with portions extending downwardly and at an angle to the vertical. Near the lower ends of these members 6 a transversely extending brace member 8 is rigidly attached to the same, and longitudinally extending rigid brackets 9 are provided which extend between these members 6 and the member 2. The U-shaped member 3 is fixed to the member 1 near the back end of the same, as shown in Fig. 2. This member is provided with a pair of vertically extending arms. The upper ends of these arms are rigidly connected together longitudinally with the upper ends of the arms of members 2 and 3 by means of plates 10 and 11.

Intermediate the members 2 and 3 laterally extending arms 12 are rigidly fixed to the member 1. These arms are provided with vertically extending portions 13 forming standards which are adapted to be attached to the standards 14 of the wheel truck 15 by any suitable means. In a preferred form they are adjustable with respect thereto through a rack and pinion mechanism 16 of the type described in our copending application Serial No. 740,484, filed Jan. 6, 1913. In order to give increased rigidity to the parts, the standards 12 are rigidly connected to the members 2 and 3 through stays 17 and 18.

A rigid tongue connection is preferably provided upon the front end of the frame, as shown in Figs. 1 and 2. This tongue connection includes an angularly disposed tongue member 19 rigidly connected to the front end of the member 1 and protruding therefrom in substantially the same plane as the latter. A plurality of stays 20 are rigidly connected between the tongue connection 19 and the front end of the member 1 and one of the members 6 in order to give the tongue the desired strength and rigidity.

In the use of our improved frame the sheaf delivery member and certain parts of its operating mechanism are carried by the members 5, 6 and 9, while the cradle which receives the sheaves therefrom is carried above the members 3 and 4, normally reclining on the frame and being pivotally connected at its rear end to the member 4 in such a manner that it may be tilted upward and rearward about that member as a pivot and between the arms of the member 3. The binding mechanism and the other mechanisms for the machine are carried upon the side members 10 and 11 fixed to the upper ends of the vertically extending U-shaped members 2 and 3 and upon portions of the frame 1 adjacent the former.

The frame shown may be made entirely of steel, and is exceedingly rigid and well adapted to withstand the conflicting lateral and longitudinal stresses incident to the operation of the shocking machinery and the trailing of the machine in the rear of the harvester. Further, the parts carrying the shocking mechanism are each rigidly attached to the skeleton of the frame and braced against stresses. At the same time the entire frame is of a construction which may be very readily and cheaply manufactured.

While we have disclosed one form which our invention may assume in practice, it is, of course, to be understood that the construction shown may be modified without departing from the spirit of our invention.

What we claim, and desire to secure by Letters Patent, is:

1. A shocking machine comprising a rigid horizontally disposed substantially U-shaped base member and a skeleton sheaf-receptacle housing frame having an open rear end, supported on said base member in rear of its front end and rigidly attached thereto.

2. In a shocking machine frame, a rigid horizontally disposed substantially U-shaped base member, a skeleton sheaf-receptacle housing frame disposed intermediate the ends thereof and rigidly attached thereto, and a plurality of laterally and upwardly projecting arms rigidly attached to the arms of said base member intermediate the ends of said frame.

3. In a shocking machine frame, a rigid horizontally disposed substantially U-shaped base member, a skeleton sheaf-receptacle housing frame having an open rear end supported on said base and rigidly attached directly thereto intermediate the ends of the latter, and a tongue rigidly attached to the bowed end of said base member and disposed at an angle thereto.

4. A shocking machine frame comprising a rigid horizontally disposed substantially U-shaped base member and an upstanding substantially U-shaped sheaf-receptacle housing frame having an open rear end supported on said base intermediate the ends of the latter and rigidly attached directly thereto at its bowed portion.

5. A shocking machine frame comprising a rigid horizontally disposed base member, a plurality of transversely disposed substantially U-shaped members having their bowed portions rigidly attached directly to said base and their arms protruding upward at right angles therefrom, and a transverse member rigidly connecting the upper ends of the arms of one of said members.

6. A shocking machine frame comprising a substantially U-shaped horizontally disposed rigid base member, a plurality of spaced transversely disposed substantially U-shaped members rigidly attached directly to said base, one of the same having the space between its arms entirely unobstructed, and longitudinally extending means directly connecting the free ends of said U-shaped members on the same side of said base member.

7. In a shocking machine frame, a horizontally disposed substantially U-shaped rigid base, a plurality of spaced transversely disposed substantially U-shaped members having their bowed portions rigidly attached directly thereto and their arms disposed substantially at right angles to said base, a transverse member connecting the ends of the arms of one of said members, and a supplemental frame directly connected between the bowed portion of said base and said transverse member.

8. A shocking machine frame comprising a substantially U-shaped horizontally disposed rigid base member, a substantially U-shaped frame having an open rear end rigidly attached directly to said base member with its arms protruding at right angles therefrom, and a plurality of laterally protruding alined arms rigidly attached directly to said base member between the ends of said frame and having vertically extending standards on their outer ends.

9. In a shocking machine frame, a substantially U-shaped horizontally disposed base member, a plurality of spaced transversely disposed substantially U-shaped members fixed directly thereto at their bottoms and projecting upward substantially at right angles therefrom, longitudinally extending members rigidly connecting the free ends of said transversely disposed U-shaped members on the same side of said base, and means directly connected between the ends of the arms of the front U-shaped member coöperating therewith to form a boxlike skeleton frame having an open rear end.

10. In a shocking machine frame, a substantially U-shaped horizontally disposed base member, laterally disposed arms rigidly attached to the base on its opposite sides having vertically extending standards on their free ends, a plurality of transversely disposed substantially U-shaped members spaced apart from each other on opposite sides of said arms extending substantially at right angles to said base and having their bowed portions rigidly attached thereto, and means rigidly connecting the adjacent ends of said transversely disposed U-shaped members with the ends of said standards.

11. In a shocking machine frame, a substantially U-shaped member extending longitudinally thereof and forming a base, laterally disposed alined arms rigidly attached directly to the opposite sides thereof having vertically extending standards on their free ends, a plurality of spaced transversely disposed U-shaped members having their bowed portions rigidly attached to said base member and their arms extending substantially at right angles with respect thereto, means rigidly connecting the ends of said transversely disposed U-shaped members on the same side of said base member, and means rigidly connecting the ends of said transversely disposed U-shaped members with the ends of said standards.

12. In a shocking machine, a substantially U-shaped horizontally disposed base member, a plurality of longitudinally spaced transversely disposed upstanding U-shaped members fixed to said base at points intermediate its ends, longitudinally extending members rigidly connecting the free ends of said U-shaped members on the same side of the base member, a transversely disposed member rigidly connecting the ends of the front U-shaped member, and a plurality of parallel forwardly projected and downwardly inclined supports having substantially horizontal portions directly connected to said transverse member and lower inclined portions directly connected to the bowed portion of said U-shaped base member.

In testimony whereof we affix our signatures, in the presence of two witnesses.

CLEMMA R. RANEY.
ROBERT C. LIVESAY.

Witnesses for Raney:
 RAY PATTISON,
 FRANK ZABILKA.
Witnesses for Livesay:
 E. H. HEMMINGSON,
 T. E. VAN METER.

Copies of this patent may be obtained for five cents each, by addressing the "Commissioner of Patents, Washington, D. C."